United States Patent
Dow et al.

(10) Patent No.: US 10,098,022 B2
(45) Date of Patent: *Oct. 9, 2018

(54) COOPERATIVE MANUFACTURING USING MOBILE MACHINES

(71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Tynan J. Garrett, Poughkeepsie, NY (US); Emily M. Metruck, Poughkeepsie, NY (US); Charles J. Stocker, IV, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 179 days.

This patent is subject to a terminal disclaimer.

(21) Appl. No.: 15/180,785

(22) Filed: Jun. 13, 2016

(65) Prior Publication Data

US 2017/0190119 A1 Jul. 6, 2017

Related U.S. Application Data

(63) Continuation of application No. 14/987,320, filed on Jan. 4, 2016.

(51) Int. Cl.
*H04W 24/04* (2009.01)
*G05B 19/4099* (2006.01)
(Continued)

(52) U.S. Cl.
CPC .......... *H04W 24/04* (2013.01); *B25J 9/1679* (2013.01); *B25J 9/1682* (2013.01);
(Continued)

(58) Field of Classification Search
None
See application file for complete search history.

(56) References Cited

U.S. PATENT DOCUMENTS

2013/0295338 A1* 11/2013 Keating .............. B29C 67/0055
428/174
2014/0067609 A1* 3/2014 Heger ................ G06Q 30/0623
705/26.61
(Continued)

OTHER PUBLICATIONS

Eli M. Dow, et al., "Cooperative Manufacturing Using Mobile Machines", U.S. Appl. No. 14/987,320, filed Jan. 4, 2016.
(Continued)

*Primary Examiner* — Dennis M Butler
(74) *Attorney, Agent, or Firm* — Cantor Colbrn LLP (57) ABSTRACT

An embodiment of a computer implemented method of manufacturing an object includes receiving instructions to manufacture an object by a three-dimensional (3D) printing operation, determining a manufacturing plan for performing the 3D printing operation, the manufacturing plan prescribing a plurality of operational stages to be performed cooperatively by a plurality of independently operable mobile machines, providing instructions to the plurality of mobile machines, each of the plurality of mobile machines configured to perform at least one of the plurality of operational stages, and manufacturing the object by the plurality of mobile machines according to the manufacturing plan.

6 Claims, 5 Drawing Sheets

(51) Int. Cl.
*B25J 9/16* (2006.01)
*H04L 29/08* (2006.01)
*B33Y 50/02* (2015.01)
*B29C 64/386* (2017.01)

(52) U.S. Cl.
CPC ........ *G05B 19/4099* (2013.01); *H04L 67/104* (2013.01); *H04L 67/12* (2013.01); *B29C 64/386* (2017.08); *B33Y 50/02* (2014.12); *G05B 2219/35134* (2013.01); *G05B 2219/39146* (2013.01); *G05B 2219/49007* (2013.01); *H04L 67/10* (2013.01); *Y10S 901/01* (2013.01); *Y10S 901/02* (2013.01); *Y10S 901/41* (2013.01)

(56) References Cited

U.S. PATENT DOCUMENTS

| | | | |
|---|---|---|---|
| 2015/0057784 A1* | 2/2015 | Butler | B29C 67/0088 700/119 |
| 2017/0021527 A1* | 1/2017 | Grivetti | E04G 21/04 |
| 2017/0188233 A1* | 6/2017 | Gupta | H04W 12/06 |

OTHER PUBLICATIONS

List of IBM Patents or Patent Applications Treated as Related; Date Filed Jun. 13, 2016, pp. 1-2.

* cited by examiner

COOPERATIVE MANUFACTURING USING MOBILE MACHINES

DOMESTIC PRIORITY

This application is a continuation of U.S. Non-Provisional application Ser. No. 14/987,320 entitled "COOPERATIVE MANUFACTURING USING MOBILE MACHINES", filed Jan. 4, 2016, which is incorporated herein by reference in its entirety.

BACKGROUND

The present invention relates generally to manufacturing using multiple moving machines, and more specifically, to planning and performing a coordinated three-dimensional printing or other manufacturing process.

Three-dimensional (3D) printing is becoming an increasingly popular technique for manufacturing many types of objects or products, from individual pieces and prototypes to commercial products. 3D printing typically involves depositing layers of a thermoplastic material by a stationary printing machine to gradually build up an object in three dimensions.

SUMMARY

An embodiment of a computer program product for manufacturing an object includes a tangible storage medium readable by a processing circuit and storing instructions for execution by the processing circuit for performing a method. The method includes receiving instructions to manufacture an object by a three-dimensional (3D) printing operation; determining a manufacturing plan for performing the 3D printing operation, the manufacturing plan prescribing a plurality of operational stages to be performed cooperatively by a plurality of independently operable mobile machines, providing instructions to the plurality of mobile machines, each of the plurality of mobile machines configured to perform at least one of the plurality of operational stages, and manufacturing the object by the plurality of mobile machines according to the manufacturing plan.

An embodiment of a computer implemented method of manufacturing an object includes receiving instructions to manufacture an object by a three-dimensional (3D) printing operation, determining a manufacturing plan for performing the 3D printing operation, the manufacturing plan prescribing a plurality of operational stages to be performed cooperatively by a plurality of independently operable mobile machines, providing instructions to the plurality of mobile machines, each of the plurality of mobile machines configured to perform at least one of the plurality of operational stages, and manufacturing the object by the plurality of mobile machines according to the manufacturing plan.

An embodiment of a system for manufacturing an object includes a plurality of independently operable mobile machines, each of the plurality of mobile machines configured to perform an aspect of a three-dimensional (3D) printing operation, and a processing device configured to communicate with one or more of the plurality of mobile machines. The processing device is configured to perform a method that includes receiving instructions to manufacture an object by a three-dimensional (3D) printing operation, determining a manufacturing plan for performing the 3D printing operation, the manufacturing plan prescribing a plurality of operational stages to be performed cooperatively by the plurality of mobile machines, providing instructions to the plurality of mobile machines, each of the plurality of mobile machines configured to perform at least one of the plurality of operational stages, and manufacturing the object by the plurality of mobile machines according to the manufacturing plan.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

There are provided methods, devices, systems and computer program products for performing cooperative manufacturing processes using multiple moving machines. An embodiment of a system includes one or more processing devices configured to perform a manufacturing operation such as a three-dimensional (3D) printing operation via a plurality of mobile robots or other mobile machines. As described herein, a "mobile" machine is a robot or other machine that can freely move around a space (e.g., a room or floor space), i.e., has no component that is fixed to a single location in the space. The mobile machines are controlled via the processing device(s) to perform the process cooperatively according to a pre-determined manufacturing plan. The plan may prescribe a number of stages, one or more of which are identified as being able to be performed by respective mobile machines in parallel. An object (or constituent objects) may be monitored during the manufacturing process for errors, and a machine is automatically directed to correct any detected error during the process. The processing device(s) may also monitor operations of each mobile machine to determine whether any machine is not operating as expected or according to the manufacturing plan, and direct a different machine to replace a machine that is not operating as expected.

In one embodiment, operation of the mobile machines is directed via a central controller or processer in communication with each of the mobile machines. In one embodiment, the mobile machines are configured to communicate with one another via a wireless communication network, and coordinate operation with one another during the manufacturing process.

Figure 1:
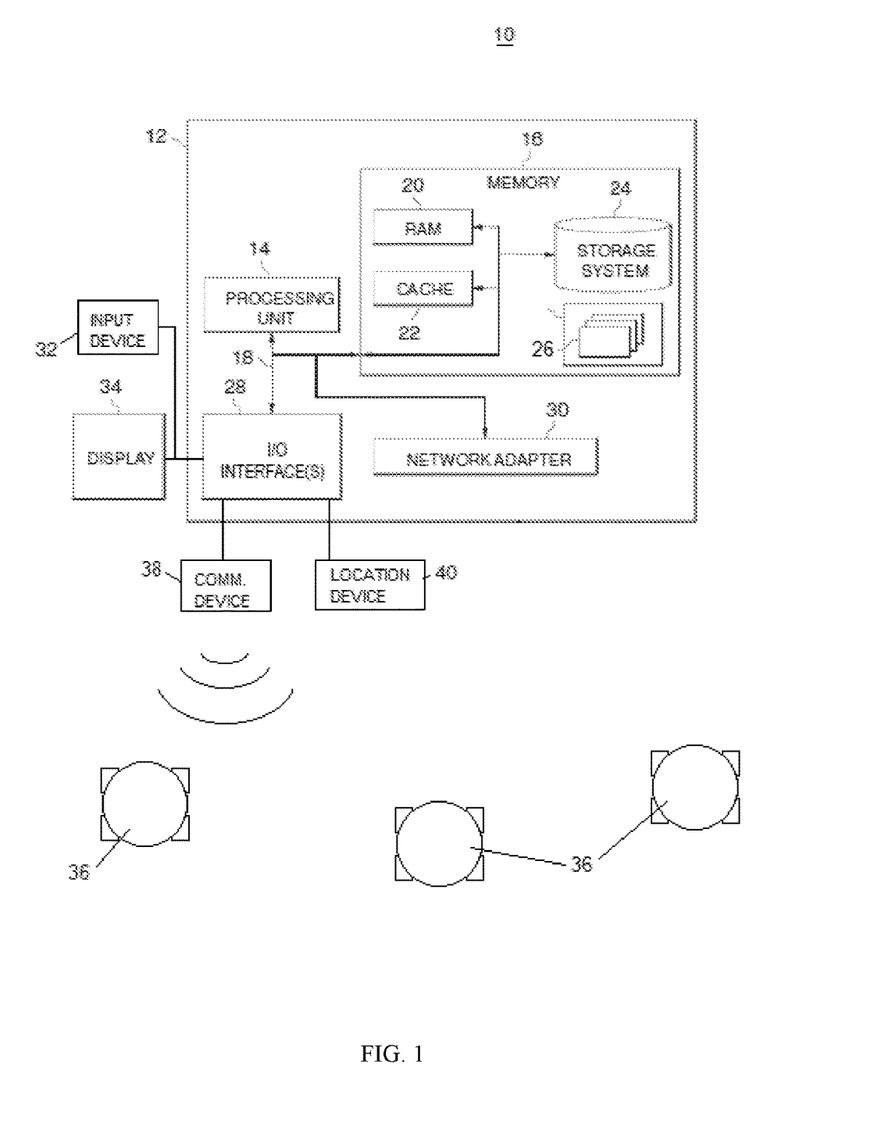
FIG. 1 depicts an embodiment of a computer system.

FIG. 1 illustrates an example of a computing system 10 that can be used to perform various actions, including receiving and processing user inputs and performing various processing actions as described herein, including storing and processing data, executing programs and displaying information. The computing system is configured to receive requests or commands to perform a manufacturing operation to manufacture and/or assemble an object, and perform aspects of the manufacturing operation, such as planning operational steps, communicating with one or more mobile manufacturing machines (e.g., mobile robots), monitoring the operation and/or adjusting tasks assigned to individual machines.

The computing system 10 includes a processing device 12, such as a computer, server, laptop or mobile device. Components of the processing device 12 may include, but are not limited to, one or more processors or processing units 14, a memory 16, and a bus 18 that couples various system components including the memory 16 to the processing unit 14. As discussed further below, the processing device 12 may be configured as part of a central controller or processor that communicates with multiple mobile machines, and/or may be incorporated in one or more of the mobile machines.

The processing device 12 typically includes a variety of computer system readable media. Such media may be any available media that is accessible by the processing device 12, and includes both volatile and non-volatile media, removable and non-removable media.

The memory 16 can include computer system readable media in the form of volatile memory, such as a random access memory (RAM) 20 and/or cache memory 22. The processing device 12 may further include other removable/non-removable, volatile/non-volatile computer system storage media. For example, a storage system 24 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the memory 16 may include at least one program product having a set (e.g., at least one) of program modules 26 that are configured to carry out the functions of embodiments described herein.

The processing device 12 includes or is connected to various components, which may be incorporated in the device 12 or external to the device 12. The device 12 includes interfaces 28 for communication with components and may also include a network adapter 30 for communication with other devices or components over a suitable network or remote connection. The device 12 is connected to or includes at least one input device 32 such as a keyboard, button, mouse and/or touchscreen, and a display 34.

The processing device 12 can communicate with one or more networks such as a local area network (LAN), a general wide area network (WAN), and/or a public network (e.g., the Internet) via the network adapter 30. As depicted, the network adapter 20 communicates with the other components of the processing device 12 via the bus 18.

The processing device 12 may also include communication components for communicating with one or more mobile machines or robots 36, which include functionality to perform aspects of manufacturing operations. The robots 36 are moveable or mobile within a manufacturing space (e.g., a factory room or floor). The communication components may include network components such as the adapter 30, wired connections and/or wireless communication devices.

In one embodiment, the device 12 includes a wireless communication device 38 such as an antenna assembly for transmitting and receiving radio communications. Such radio communications can be performed using devices having various ranges, such as long range communication devices and short range devices such as Bluetooth, Wi-Fi and/or near field communication (NFC) components.

The device 12 may also include location components 40 such as a GPS receiver, optical sensors (e.g., cameras), and any other components that allow for determining the location of the device 12 and/or determining the location of each robot 36 during manufacturing.

The components shown in FIG. 1 and described herein are provided for illustrative purposes and are not intended to be limiting. It should be understood that although not shown, other hardware and/or software components could be used in conjunction with the processing device 12. Examples, include, but are not limited to: microcode, device drivers, redundant processing units, external disk drive arrays, RAID systems, tape drives, and data archival storage systems, etc.

The processing device 12 and/or other components of the system 10 may be incorporated into a centralized control device such as a workstation or laptop computer, or disposed in or with one or more of the robots 36. For example, the processing device 12 may control each robot 36 as a central controller. Alternatively, each robot 36 may include its own memory and processing components for performing the robot's functions, communicating with other robots, and/or coordinating tasks among the robots as described further herein.

The system 10 can be utilized to manufacture an object using the robots 36, which are programmed to communicate and work in a cooperative manner. Each robot 36 may have multiple capabilities to perform multiple aspects of a manufacturing operation (e.g., constructing individual parts, retrieving components or tools, assembling components, etc.), and/or be specialized to perform specific aspects.

An example of a manufacturing process that can be performed by embodiments described herein is a three-dimensional (3D) printing process. 3D printing generally refers to processes of manufacturing 3D solid objects by forming successive layers of an extrudable and settable material. An object is formed by depositing layers of a material according to a pre-determined pattern or plan. The object may be printed as a single piece, or printed as multiple pieces and welded, adhered or otherwise coupled to form the object.

Figure 2:
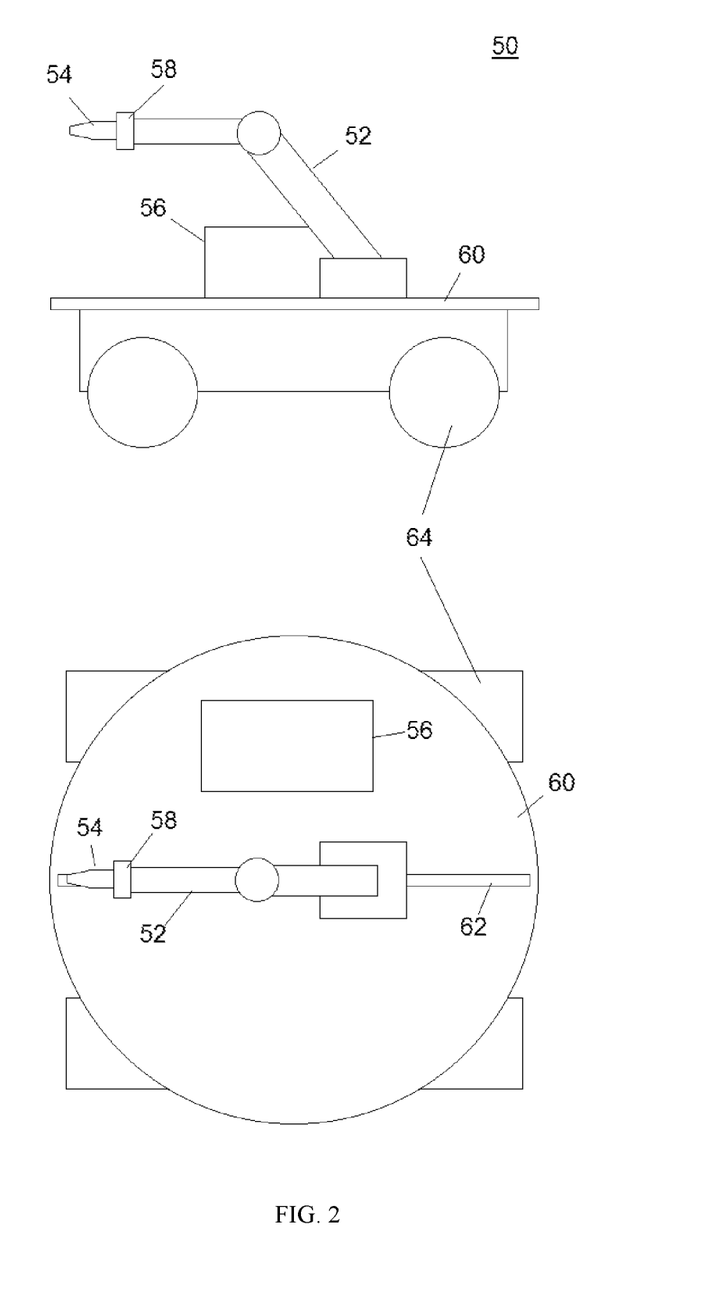
FIG. 2 depicts an embodiment of a mobile machine that can be utilized to perform manufacturing functions.
Figure 3:
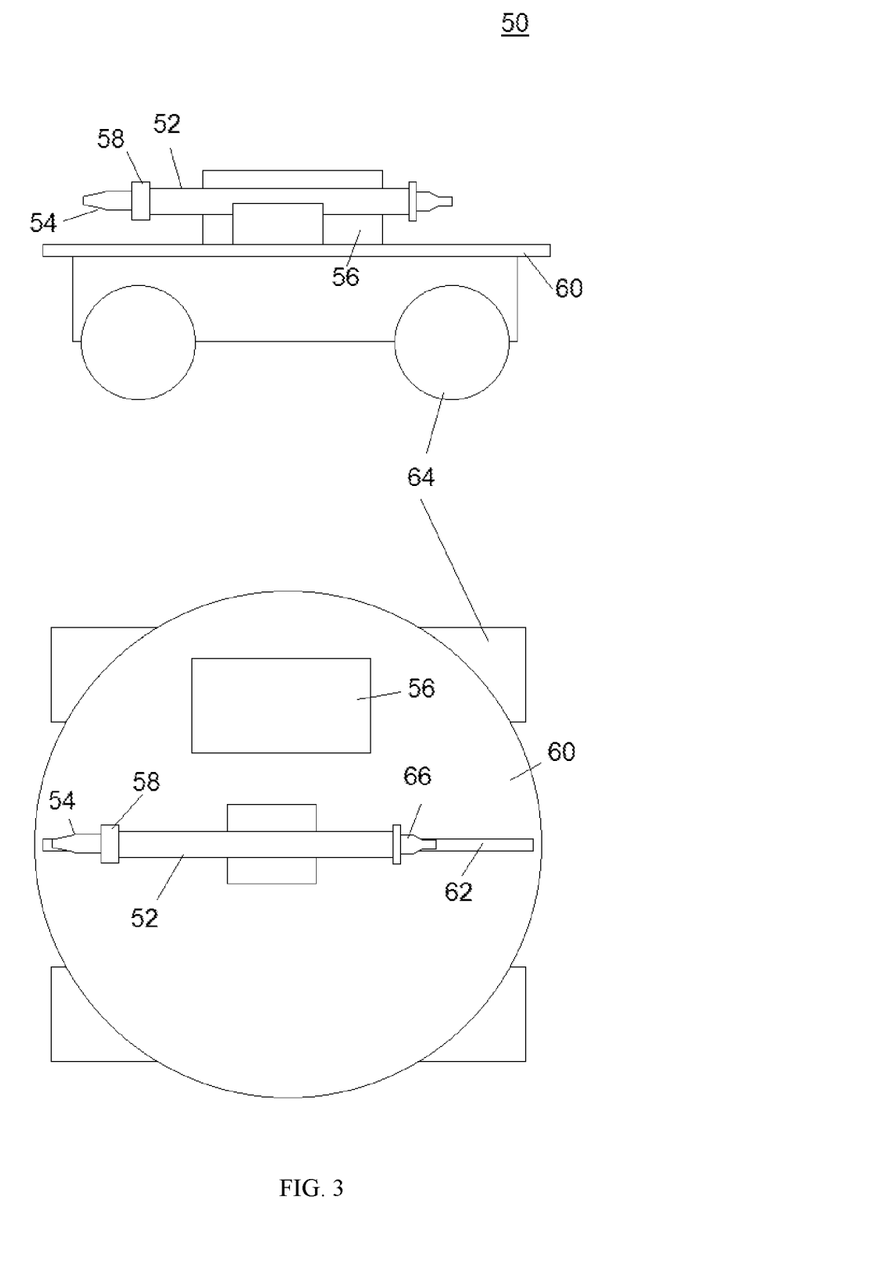
FIG. 3 depicts an embodiment of a mobile machine that can be utilized to perform manufacturing functions.

FIGS. 2 and 3 illustrate an embodiment of a mobile machine that can be utilized to perform manufacturing functions. The mobile machine is configured as a mobile robot 50, which in one embodiment is incorporated in the system 10 as one of the robots 36. In this embodiment, the robot 50 is configured to perform aspects of a three-dimensional (3D) printing operation. The term "robot" is used herein to describe any suitable type of machine that can move within a manufacturing space and perform manufacturing functions, and is not intended to limit the machine to a particular type or configuration.

The robot 50 includes a moveable arm 52 that is configured to move in two or three dimensions to position one or more tools or devices during manufacturing. In the embodiment of FIG. 2, the moveable arm is a reticulated arm coupled to a motor and attached to a dispensing head 54. The dispensing head 54 is connected to a material source 56, such as a filament roll or pellet supply. The material is melted and fed through the dispensing head nozzle having an aperture of any suitable size. Examples of materials that can be used include plastics materials such as thermoplastics. Suitable thermoplastics include, for example, acrylonitrile butadiene styrene (ABS), nylon, polystyrene and polylactic acid (PLA).

The dispensing head is connected to the material source 56 by a feed tube or line, and may include a heating unit for melting the material. For example, a heating unit 58 is disposed proximate to the dispensing nozzle, although the heating unit (or an additional heating unit) can be disposed at any suitable location.

The arm 52 is disposed on a rotating platform 60, which can be rotated 360 degrees or less. The arm 52 may be coupled to the platform 60 on a rail 62 that allows the arm 52 to be advanced or retracted. The robot 50 is also equipped with motive features such as wheels 64, tracks or any other feature that allows the robot 50 to freely move around a manufacturing space. Other motive features may be used depending on the manufacturing environment (e.g., open air or viscous liquid).

The robot 50 may be equipped with any number of tools or devices for performing various manufacturing functions. In the embodiment of FIG. 3, the arm 52 includes an additional tool in the form of a welding head 66 disposed at an opposite end of the arm 52 relative to the dispensing head. Other examples of tools that may be included in the robot 50 include sintering tools, milling tools, cutting tools, smoothing or sanding tools, scanning devices (e.g., for error checking and quality control) and others.

The robot 50 further includes a communication device, such as a wireless transmitter and receiver to allow for communication between robots. In one embodiment, the communication device enables peer-to-peer connectivity between the robots. For example, each robot is programmed or configured to operate with other robots in cooperation, e.g., as a swarm. The robots may have the same design and/or capabilities, or robots may have separate capabilities (e.g., deposition, sintering, welding, milling, coordination, back-up).

The robot 50 also includes a processing unit configured to control operation, receive data and instructions and communicate with other robots and/or a centralized controller. In one embodiment, the robot 50 is autonomous (having no centralized controller) and the processing unit controls operation based on a manufacturing plan, as well as algorithms that prescribe behavior changes in response to various conditions. The processing unit may also monitor the operation and adjust controls and/or communicate with other robots based on the monitoring.

For example, the processing unit executes control of the robot 50, and determines the operation to be performed based on printing instructions and a manufacturing plan. The printing is performed according to instructions in the form of, e.g., 3D printer control software that utilizes an object design document describing a sequence of signals to control the movement of a 3D printer head assembly and production of extruded material. The object design document may be created using, e.g., computer-aided design software.

Figure 4:
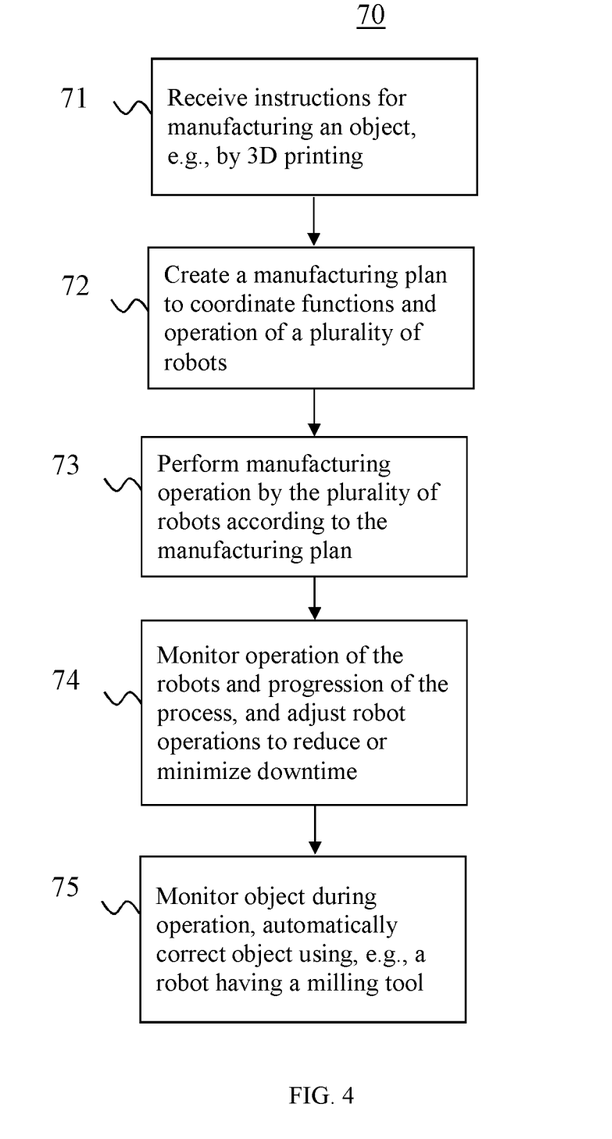
FIG. 4 is a flow diagram depicting an embodiment of a method of manufacturing an object.

FIG. 4 is a process flowchart depicting an embodiment of a method 70 for performing aspects of manufacturing an object. The method 70 includes a number of process steps represented by blocks 71-75. The method 70 is described in conjunction with the processing device 12 and a plurality of mobile machines, such as robots 36 and/or robots 50, but is not so limited. In one embodiment, the method 70 includes the execution of all of the stages shown in blocks 71-75 in the order described. However, certain stages may be omitted, stages may be added, or the order of the stages changed.

At block 71, instructions for manufacturing an object are received. The object may be any type of physical object, assembly or product. In one embodiment, the object is any object or assembly capable of being manufactured via 3D printing. For example, the instructions include an object document describing required specifications and materials including, e.g., measurements, plans, drawings, computer-aided design (CAD) images, etc.

At block 72, a manufacturing plan is created. The manufacturing plan describes a manufacturing process as a series of operational steps or stages that are to be performed by a plurality of mobile machines, such as a plurality of robots 50. The manufacturing plan prescribes an operation or operations that are to be performed at each stage of the process. In one embodiment, the manufacturing plan is created or generated by decomposing the object and manufacturing process into portions or phases, which can include constituent components of the object and constituent functions that can be performed separately (in sequence and/or in parallel) by individual robots. The phases are scheduled to allow formation and assembly of the object to be performed in an increased or optimally efficient manner, e.g., by reducing or minimizing the time and/or resources required to complete the object. In one embodiment, phases are identified that can be accomplished in parallel to allow multiple robots to perform their functions simultaneously or within the same approximate time period.

Various considerations are taken into account in generating the manufacturing plan. For example, the object and/or instructions provided are analyzed to determine how the object can be decomposed and how the constituent components of the object are to be assembled or joined (e.g., interlocking, adhesive, welding, successive deposition onto an existing component, etc.). In addition, the order in which different components are to be formed, including identifying which components can be built in parallel, is determined. The plan is created based on the number, types and capabilities of the robots to avoid any downtime, scheduling conflicts or deadlock, and other complications that could reduce efficiency and/or effectiveness.

Figure 5:
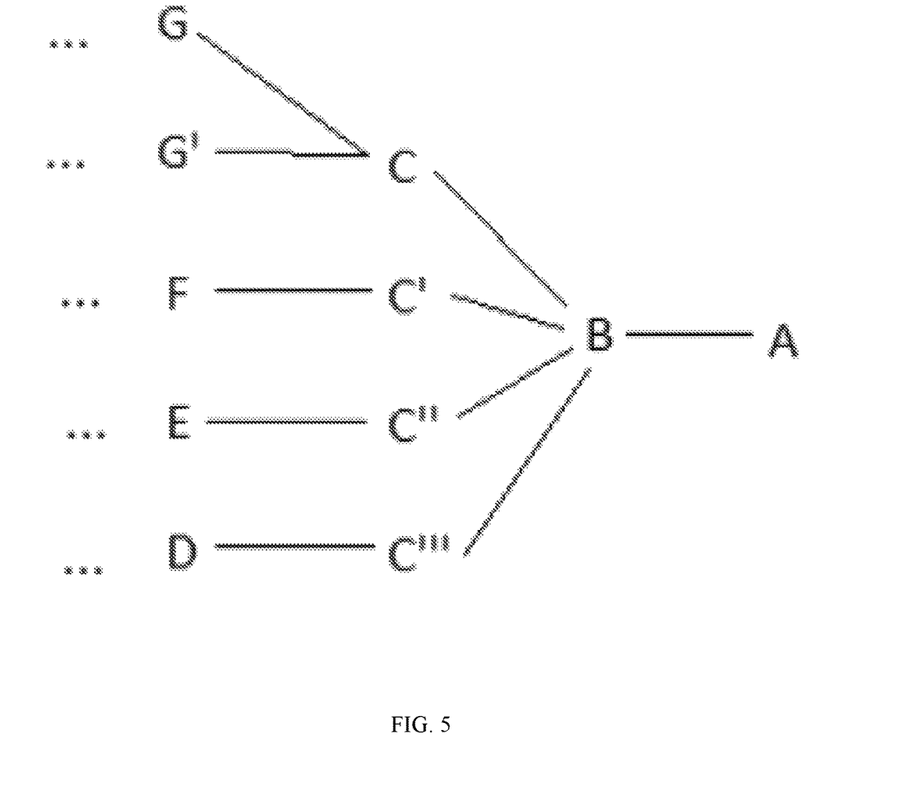
FIG. 5 depicts aspects of a plan for manufacturing an object based on cooperative operation of a plurality of mobile machines.

An example of a manufacturing plan is shown in FIG. 5. In this example, a plan including a plurality of stages that can be performed sequentially and/or in parallel and defines dependencies between phases. This example represents a 3D printing operation for manufacturing an object having multiple parts, which can be manufactured separately and later assembled or joined. It is noted that the stages described are examples and are not limiting. Also, although the manufacturing example of FIG. 5 relates to 3D printing, the example and the concepts described in conjunction with this example can be applied to any type of operation and object.

In this example, the manufacturing plan is constructed for producing an object referred to as object A. A tree of dependencies is generated, which includes manufacturing multiple constituent components. The plan includes forming components G and G' as separate stages, which can be performed in parallel. Each stage involves depositing successive layers of a material to form the component, optionally followed by performing additional functions such as milling, smoothing and shaping to correct errors, remove extraneous material (e.g., seams) and otherwise prepare the component.

After components G and G' are complete, the manufacturing plan prescribes assembling or joining the components (e.g., by welding) to form a component C. As shown in FIG. 5, components E, F and D can be formed in parallel. Additional stages are performed to produce a subsequent component by performing processes such as adding additional portions by deposition. Components C', C" and C'" are produced during these stages from components E, F and D, respectively, and subsequently assembled to form a component B. Lastly, a finishing stage or stages involves performing functions such as shaping, smoothing, inspection and other quality control, error correction, coating and packaging. The finishing stage or stages produces the final manufactured object A.

The manufacturing plan can be divided and distributed spatially as well as temporally. For example, the manufacturing plan includes a grid system or other feature that divides an object and/or object component into different spatial regions. Multiple robots can, in this way, work simultaneously or otherwise in conjunction in the same component or object by building a portion of the component or object within its assigned region.

The manufacturing plan may also include assignment of functions or duties to individual robots. The functions can be made unique to an individual robot or can be assigned to a group of robots so that robots can automatically replace one another to avoid downtime.

At block 73, each robot is given instructions for performing its respective role, and each robot commences performing its respective function according to the manufacturing plan.

For example, during an initial time period, one or more initial constituent components are formed in parallel by respective robots, e.g., robots 50. Each robot forms a respective component by extruding fluid material and depositing the material on a surface material, and then depositing successive layers until the respective component is formed. Each robot may then perform additional functions such as milling or sanding to remove unwanted material, or communicate with a central controller or via a peer-to-peer network to request another robot to perform the additional functions.

As an initial component (e.g. components G, G', F, E and/or D) is completed, the robot that formed the initial component may be tasked to perform further functions in parallel with formation of the other initial components, or be tasked to perform functions corresponding to a subsequent stage.

At block 74, the manufacturing process is monitored to determine whether the process is proceeding as planned and whether each robot is performing according to expectations. In response to detecting that the overall process or any individual operation is not proceeding as planned, operations of one or more of the robots can be adjusted in order to reduce or minimize down time. "Down time" may refer to a period of time during which a prescribed operation is not being performed or is being performed too slowly, or a period of time during which a robot is not operating as planned or operating correctly.

For example, a centralized controller or one or more robots detects a condition in which a robot is not operating properly, operating too slowly, not operating at all. The centralized controller or one or more robots may also detect an impending condition that would cause downtime, for example a notification that a robot's battery is running low. In response to detecting such a condition, the centralized controller automatically directs an available robot to replace the robot that is not performing to expectations. In another example, replacement of robots is scheduled in advance according to expected conditions, e.g., expected times at which a robot's battery is to run low.

In one embodiment, the monitoring includes determining whether there are any robots that are not currently being utilized, and determine whether there are any tasks that can be performed in parallel with other robots. If there are available tasks a robot having appropriate functionality is identified, that robot is tasked to commence performing one or more available tasks.

In one embodiment, each robot is instructed or programmed to determine whether a stage is not being performed as planned (e.g., by monitoring other robots or communicating with a central controller) and replace a robot if available. For example, if a robot's battery is running low, the robot can communicate via peer-to-peer communication to other robots to request replacement, notify a central controller or otherwise communicate to prompt replacement by another robot if available.

At block 135, the object is monitored continuously or periodically during the manufacturing process to determine whether the object being manufactured is conforming to specifications. Monitoring, in one embodiment, includes evaluating the object and/or constituent components at multiple times during the manufacturing process. At each time, the object and/or components are measured or otherwise inspected to determine whether the dimensions of the object and/or components conform to those prescribed by the manufacturing instructions and manufacturing plan.

For example, during a 3D printing process, one or more robots or other suitable devices perform measurements of the object and/or component and comparing the measurements to design specifications to calculate a delta value or values. If at any time the measurements do not meet the minimum requirements of some set bound error, a corrective action is automatically triggered. The robot currently depositing the object or component, or another robot receiving an error notification from the current robot or a central controller, sets a milling tool or other appropriate tool into action to remove an area or region that has exceeded the bound error and begin to rebuild the object. In the case of the robot 50 shown in FIG. 2 or 3 (or a similarly equipped machine), shavings generated by the milling may be caught by a tray or receptacle, melted and reused (e.g., by reforming into pellet or filament form).

Technical effects and benefits include the ability to perform collaborative manufacturing operations using multiple moveable machines, which removes or eases size restrictions (e.g., due to machine or printer sizes). In addition, embodiments described herein provide for increased speed and efficiency by reducing downtime and increasing the ability to perform multiple operations in parallel.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method of manufacturing an object, the method comprising:
   receiving, by a. processing device, instructions to manufacture an object by a three-dimensional (3D) printing operation, wherein the processing device is configured to communicate with a plurality of independently operable mobile robots, wherein each of the plurality of mobile robots includes one or more tools, a moveable arm, and a dispending head, wherein the moveable arm is configured to move in two or three dimensions to position the one or more tools during manufacturing, and wherein the dispensing head is connected to a material source and includes a heating unit and a dispensing nozzle;
   generating, by the processing device, a manufacturing plan for performing the 3D printing operation by at least decomposing the object into a plurality of constituent components and identifying components of the plurality of constituent components that can be manufactured in parallel by separate mobile robots of the plurality of mobile robots; and
   programming, by the processing device, the plurality of mobile robots to manufacture the object based on the generated manufacturing plan, wherein each of the plurality of mobile robots manufactures at least one component of the identified components as a result of the programming.

2. The method of claim 1, wherein the plurality of mobile robots are configured to wirelessly communicate with one another via a peer-to-peer network.

3. The method of claim 1, wherein the central controller, and wherein the plurality of mobile robots communicate with and are directed by the central controller according to the manufacturing plan.

4. The method of claim 1, wherein determining the manufacturing plan includes identifying one or more stages that can be performed in parallel by separate mobile robots of the plurality of mobile robots.

5. The method of claim 1, wherein the one or more tools includes a milling tool, wherein the material source comprises a filament roll or pellet supply, and wherein the method further comprises monitoring the object during the manufacturing by comparing measurements of the object to specifications prescribed by the programming, and in response to detecting a difference between the measurements and the specifications that is greater than a selected amount, automatically directing one of the plurality of mobile robots to correct the object by programming the one of the plurality of mobile robots to remove, via the milling tool of the one of the plurality of mobile robots, an area that has exceeded the selected amount, wherein the removal of the area by milling generates shaving that are caught by a tray of the one of the plurality of mobile robots, wherein the programming further includes programing the one of the plurality of mobile robots to melt the shavings using the heating unit of the one of the plurality of mobile robots and to reform the melted shavings into pellet or filament form.

6. The method of claim 1, wherein the method further comprises monitoring the plurality of mobile robots during the manufacturing, and in response to detecting that a first mobile robot is not operating as expected, automatically directing a second mobile robot to replace the first mobile robot.

* * * * *